United States Patent
Ma et al.

(10) Patent No.: US 12,536,648 B2
(45) Date of Patent: Jan. 27, 2026

(54) INTELLIGENT RECOGNITION METHOD FOR TIME SEQUENCE IMAGE OF CONCRETE DAM DEFECT

(71) Applicants: Hohai University, Jiangsu (CN); Huaneng Lancang River Hydropower Inc, Yunnan (CN)

(72) Inventors: Hongqi Ma, Yunnan (CN); Hua Zhou, Yunnan (CN); Yingchi Mao, Yunnan (CN); Fudong Chi, Yunnan (CN); Xiaofeng Zhou, Yunnan (CN); Xuexing Cao, Yunnan (CN); Rongzhi Qi, Yunnan (CN); Hao Chen, Yunnan (CN); Bin Tan, Yunnan (CN); Bingbing Nie, Yunnan (CN)

(73) Assignees: Hohai University, Nanjing (CN); Huaneng Lanceng River Hydropower Inc, Kunming (CN)

( * ) Notice: Subject to any disclaimer, the term of this patent is extended or adjusted under 35 U.S.C. 154(b) by 236 days.

(21) Appl. No.: 18/322,605

(22) Filed: May 24, 2023

(65) Prior Publication Data
US 2023/0368371 A1   Nov. 16, 2023

Related U.S. Application Data

(63) Continuation of application No. PCT/CN2023/082484, filed on Mar. 20, 2023.

(30) Foreign Application Priority Data

May 11, 2022 (CN) .......................... 202210515193.9

(51) Int. Cl.
*G06T 5/50*   (2006.01)
*G06T 7/00*   (2017.01)
*G06V 10/44*  (2022.01)

(52) U.S. Cl.
CPC ............... *G06T 7/001* (2013.01); *G06T 5/50* (2013.01); *G06V 10/44* (2022.01);
(Continued)

(58) Field of Classification Search
None
See application file for complete search history.

(56) References Cited

U.S. PATENT DOCUMENTS 11,954,844 B2 * 4/2024 Kong ...................... G06T 7/001
12,033,315 B1 * 7/2024 Wu ....................... G06V 10/751
(Continued)

OTHER PUBLICATIONS

"Jaccard index", from https://en.wikipedia.org/wiki/Jaccard_index, downloaded Jun. 8, 2025 (Year: 2025).*
(Continued)

*Primary Examiner* — Gregory A Morse (57) ABSTRACT

Disclosed is an intelligent recognition method for a time sequence image of a concrete dam defect. The method includes: extracting a feature sequence of the time sequence image containing the concrete dam defect; matching a located defect with a real defect by using an objective function; adding a loss term based on a tight sensing intersection-over-union to a loss function of a model so as to pay attention to integrity of a defect sequence and improve accuracy; and extracting a defect feature and recognizing a defect type after completing defect location. According to the present disclosure, the time sequence image of the concrete dam defect is detected effectively, so that a defect in a long image sequence can be located and the defect type can be recognized accurately.

18 Claims, 3 Drawing Sheets

(52) U.S. Cl.
CPC ............... *G06T 2207/10024* (2013.01); *G06T 2207/20084* (2013.01); *G06T 2207/20221* (2013.01); *G06T 2207/30132* (2013.01); *G06V 2201/07* (2022.01)

(56) References Cited

U.S. PATENT DOCUMENTS

| | | | | |
|---|---|---|---|---|
| 12,159,385 | B1* | 12/2024 | Yu | G06V 20/176 |
| 2019/0332881 | A1* | 10/2019 | Hoshino | G06V 10/764 |
| 2020/0175352 | A1* | 6/2020 | Cha | G06N 3/04 |
| 2022/0327676 | A1* | 10/2022 | Shin | G06T 7/0002 |
| 2023/0119211 | A1* | 4/2023 | Cheng | G06N 5/01 705/305 |
| 2023/0368371 | A1* | 11/2023 | Ma | G06V 10/44 |
| 2023/0401390 | A1* | 12/2023 | Zhou | G06F 40/40 |
| 2024/0029225 | A1* | 1/2024 | Ozeki | G06Q 10/103 |
| 2025/0245390 | A1* | 7/2025 | Chen | G06F 30/13 |
| 2025/0245391 | A1* | 7/2025 | Chen | G06F 30/13 |

OTHER PUBLICATIONS

Fish et al., "Two-Stream Transformer Architecture for Long Form Video Understanding", 2022 (Year: 2022).*

Yang et al. "Deep Neural Network based Visual Inspection with 3D Metric Measurement of Concrete Defects using Wall-climbing Robot", 2019 IEEE/RSJ International Conference on Intelligent Robots and Systems (IROS), Nov. 2019 (Year: 2019).*

Li et al., "Two-Stream Convolution Augmented Transformer for Human Activity Recognition", 2021 (Year: 2021).*

Li et al., "A deep residual neural network framework with transfer learning for concrete dams patch-level crack classification and weakly-supervised localization", Measurement 188 (2022) (Year: 2022).*

International Preliminary Examination Report (english translation) PCT/CN2023/082484, Jun. 20, 2023 (Year: 2023).*

* cited by examiner

INTELLIGENT RECOGNITION METHOD FOR TIME SEQUENCE IMAGE OF CONCRETE DAM DEFECT

TECHNICAL FIELD

The present disclosure belongs to the technical field of recognition of a time sequence image of a concrete dam defect, and particularly relates to a defect recognition method based on a time sequence difference and a self-attention mechanism.

BACKGROUND TECHNOLOGY

In the field of constructional engineering, inspection items or inspection points that do not satisfy requirements of engineering construction quality are defined as defects. With long-term operation of hydropower station dams, material aging, environmental impact and other factors have led to formation of defects to varying degrees. If a degree of defects is low, corresponding measures can be taken to deal with in time to meet the bearing requirements of the structures. Upon the defects are not treated and repaired in time, operational safety of dams will be threatened seriously. Therefore, utilizing an automatic patrol and inspection device to detect and eliminate defects timely can maintain the structural safety of dams effectively.

In an actual patrol and inspection scene of hydropower dams, data acquired by unmanned aerial vehicles, mobile cameras and other devices are all composed of videos. In the process of acquiring and transmitting, the videos will be compressed and encoded in order to save cost, resulting in that the model cannot directly process the video data. The videos thereby need to be converted into a time-dimensional image sequence, and the defects are located and recognized by extracting feature information from the time sequence image. While an actual acquired time sequence image often contains a large number of background frames independent of the defects, so it is difficult to recognize the whole image sequence directly.

SUMMARY OF THE PRESENT DISCLOSURE

An objective of the present disclosure: according to the above analysis of the prior art, a model needs to pay attention to a contextual feature relation of an image sequence so as to ensure integrity of defect extraction and recognition accuracy in a task of defect recognition of a time sequence image. In order to rapidly recognize the time sequence image of a dam defect collected by an automatic device, the present disclosure provides an intelligent recognition method for a time sequence image of a concrete dam defect.

Technical solutions: an intelligent recognition method for a time sequence image of a concrete dam defect includes extracting a feature sequence of a time sequence image containing a dam defect by using a two-stream network, and adding a time-dimensional self-attention mechanism so as to obtain a global feature relation; matching, in a training process of the model, a located defect with a real defect by using an objective function based on a distance intersection-over-union, and computing a time sequence position relation of a defect so as to accelerate a model convergence rate; adding a loss term based on a tight sensing intersection-over-union to a loss function of the model, so as to pay attention to integrity of a defect sequence and improve accuracy; and after completing defect location, extracting a defect feature by using a convolutional neural network based on a two dimensional (2D) time sequence difference and recognizing a defect type.

The specific steps are as follows:

(1) designing a defect location model for a time sequence image characteristic containing the dam defect; extracting, by the model, a time sequence feature by using a two-stream network and a Transformer network, specifically, extracting the image feature by using the two-stream network, and adding a time-dimensional self-attention mechanism to an image frame through the Transformer network; and obtaining a global feature relation, so as to locate the defect;

(2) matching, in a training process of the defect location model, a located defect with a real defect by using an objective function based on a distance intersection-over-union; computing a defect position relation so as to accelerate a model convergence rate; adding a loss term based on a tight sensing intersection-over-union to a loss function; and paying attention to integrity of a defect sequence so as to improve accuracy of defect location; and (3) after locating the defect sequence, performing frame sampling by using a convolutional network based on a 2D time sequence difference; and extracting visual and displacement information from a defect image frame so as to recognize a defect type.

The extracting a time sequence feature by using a two-stream network and a Transformer network specifically includes:

(1.1) inputting an original time sequence image, denoted by $$X = \{x_n\}_{n=1}^{l},$$

where the sequence contains an image frame, and xi, represents an $N_{th}$ frame of the sequence X;

(1.2) converting the original time sequence image into $S_n=(x_{t_n}, o_{t_n})$ as an input of the two-stream network, where $x_{t_n}$ represents a red green blue (RGB) image of a $t_n$ frame of the original sequence image X; processing through a spatial stream convolutional network, where $o_{t_n}=d_{t_n}(u, v)$ represents an optical flow stacked by RGB images of the $t_n$ frame and a $t_{n+1}$ frame; and processing through a temporal stream convolutional network, where $d_{t_n}(u, v)$ represents a horizontal or vertical displacement vector of the $t_{n+1}$ frame at the point (u, v), $d_{t_n}^{x}(u, v)$ and $d_{t_n}^{y}(u, v)$ represent horizontal and vertical displacement vectors of the $t_{n+1}$ frame at the point (u, v), respectively, and may be regarded as two input channels of a convolutional neural network; and in order to represent motion of a series of time sequence images, optical flows of L consecutive frames are superimposed to define 2L input channels, and an input of any frame τ is composed of the following formulas:

$$I_\tau(u, v, 2k-1) = d^{x}_{\tau+k-1}(u, v),$$

$$I_\tau(u, v, 2k) = d^{y}_{\tau+k-1}(u, v), u = [1; w], v = [1; h], k = [1; L],$$

where w and h in the formulas represent a width and a height of an input image, respectively;

(1.3) denoting a feature sequence of a time sequence image extracted by the two-stream network by $$F = \{f_{t_n}\}_{n=1}^{l_s},$$

and constituting a boundary assessment network by three convolutional layers; computing probabilities $$P_s = \{p^s_{t_n}\}_{n=1}^{l_s} \text{ and } P_E = \{p^e_{t_n}\}_{n=1}^{l_s}$$

of each frame as a start frame and an end frame of the defect sequence; and multiplying and combining an input feature of the time sequence image and the predicted probabilities, corresponding to each time sequence position, of start and end of the defect, so as to obtain the feature sequence:

$$\hat{x}_{t_n} = x_{t_n} \times p^s_{t_n} \otimes x_{t_n} \times p^e_{t_n};$$

(1.4) after obtaining the feature sequence $\hat{x}_{t_n}$ corresponding to the image, adding a position code so as to mark the time sequence position for each frame, and computing a global self-attention weight for each frame by using the Transformer network;

$$MultiHeadAtten(\hat{x}_{t_n}) = \sum_{m=1}^{M} W_m \left[ \sum_{k \in \Omega_k} A_{mqk} \cdot W'_m \hat{x}_{t_n} \right],$$

where $W_m$ and $W'_m$ are attention matrices with a learnable weight, which is learned via a network, the attention matrices have same functions and same dimensions and different weight values, $A_{mqk}$ is a multi-head self-attention weight, $\Omega_k$ is a dimension of the image sequence, and a feature sequence of a defect image containing the attention weight is obtained; and (1.5) regarding an image sequence of the feature sequence of the defect image containing the attention weight as an input by using multi-layer perceptron, and predicting and outputting positions of the start frame and the end frame.

The matching, in a training process of the defect location model, a located defect with a real defect by using an objective function based on a distance intersection-over-union; computing a defect position relation so as to accelerate a model convergence rate; adding a loss term based on a tight sensing intersection-over-union to a loss function; and paying attention to integrity of a defect sequence so as to improve accuracy of defect location specifically includes:

(2.1) matching, in the training process of the model, the located defect $\hat{\varphi}_j$ with the real defect $\varphi_j$ pairwise, and then computing an error between a model location interval and a real defect interval (an interval error for short) as a loss value so as to optimize the model; and computing, in a matching process, an optimal match by maximizing the objective function, where the objective function is as follows:

$$\pi = \arg\max \Sigma_{n=1}^{N}(DIoU(\varphi_n, \hat{\varphi}_n) - l_1(\varphi_n, \hat{\varphi}_n)),$$

where l1 is an L1 objective function having a strict matching boundary and DIoU is the distance intersection-over-union;

(2.2) in order to a training rate of the model and ensure that the model may converge when the located defect and real defect are not overlapped, defining the objective function based on the distance intersection-over-union as:

$$DIoU = IoU - \frac{\rho^2(b, b^t)}{c^2},$$

where IoU is an intersection-over-union of two defects; b and $b^t$ are central point coordinates of intervals of the located defect and the real defect, respectively; ρ represents computing a distance between two points (a central point between two intervals); and c is a length of a minimum time interval covering the intervals of the located defect and the real defect simultaneously; and (2.3) finally defining a loss function of a defect location task as:

$$L_{box} = \frac{1}{N} \sum_{n=1}^{N} (L_{bou} + L_{pre}),$$

where $L_{bou}$ is a boundary loss configured to measure a difference between the start and end frames of a defect interval and a real defect interval;

$$L_{bou} = (\hat{t}_s - t_s)^2 + (\hat{t}_e - t_e)^2,$$

where $t_s$ and $t_e$ are positions of the start and end frames of the interval containing the defect, $\hat{t}_s$ and $\hat{t}_e$ are the start and end positions of a predicted defect interval, $L_{pre}$ is an interval loss configured to measure accuracy and integrity of the defect interval predicted by the model;

$$L_{pre} = 1 - IoU \cdot \left(1 - \frac{\hat{\varphi} - \hat{\varphi} \cap \varphi}{\hat{\varphi}}\right),$$

where $\hat{\varphi}$ and $\varphi$ are a located interval and a real interval, and IOU is the intersection-over-union of two intervals.

The performing frame sampling by using a convolutional network based on a 2D time sequence difference; and extracting visual and displacement information from a defect image frame so as to recognize a defect type specifically includes:

(3.1) dividing the image sequence $\hat{x}_{t_n}$ containing the defect into T non-overlapped fragments having an equal length, and randomly selecting a frame $x_t$ from each fragment so as to form a set X=[$x'_1, x'_2, \ldots, x'_T$] to increase variety of training, so that the convolutional network based on the 2D time sequence difference may learn changes of different instances of the same defect; and the features are extracted from all sampling frames in X through the 2D convolutional neural network, so as to obtain a feature set F=[$F_1, F_2, \ldots, F_T$];

(3.2) representing motion information by the sampling frame of $\hat{F}_t = F_t + H(x_t)$, where in the feature $\hat{F}_t$, the sampling frame Ft contributes visual image information and the feature stacking $H(x_t)$ contributes local motion information, which are obtained by extracting and stacking the features of each frame before and after the sampling frame by an average pooling layer; and (3.3) decoding a sampled feature image sequence $\hat{F}_t$ by using a multi-layer perceptron and a softmax function, so as to obtain the defect type.

A computer device includes a memory, a processor and a computer program stored in the memory and runnable on the processor; and when the processor executes the computer program, the intelligent recognition method for a time sequence image of a concrete dam defect is implemented.

A computer-readable storage medium stores a computer program configured to execute the intelligent recognition method for a time sequence image of a concrete dam defect.

Beneficial effects: compared with the prior art, the present disclosure has the following advantages:
(1) the time-dimensional self-attention mechanism is added to the image sequence by using the Transformer network, such that the model can pay attention to the global feature relation so as to improve the accuracy of the defect location;
(2) the objective function based on the distance intersection-over-union and the loss term based on the tight sensing intersection-over-union are added in the training process of the model, and the position information and integrity of the defect are paid attention to, so that the model convergence rate is accelerated, and the location accuracy is improved; and
(3) in the process of recognizing the defect, the sampling frame may contain the image feature and displacement information of the defect simultaneously by using the convolutional network based on the 2D time sequence difference, and the recognition accuracy is improved while computation resources are saved.

SPECIFIC EMBODIMENTS

The present disclosure will be further described in detail below with reference to specific examples. It should be understood that the following examples are merely illustrative of the present disclosure and not the limitation of the scope of the present disclosure. Upon reading the present disclosure, various equivalent modifications of the present disclosure made by those skilled in the art fall within the scope defined by the attached claims of the present application.

Figure 1:
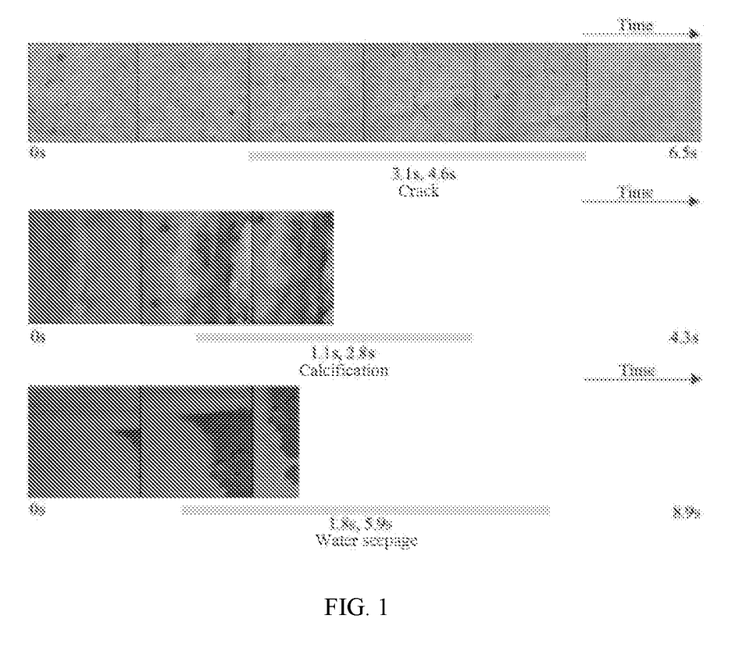
FIG. 1 is a schematic diagram of a time sequence image of a dam defect according to an example.

There are known time sequence images of patrol and inspection defects in a dam project of a power station, and each image may contain four kinds of defects, namely cracking, precipitation of alkaline substances, water seepage and scaling of concrete, as shown in FIG. 1.

Figure 2:
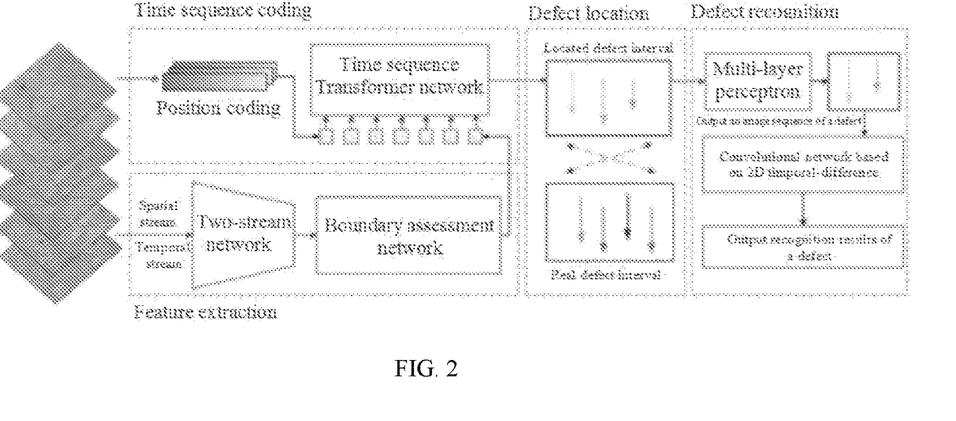
FIG. 2 is an overall block diagram of a recognition method for a time sequence image of a dam defect according to an example.
Figure 3:
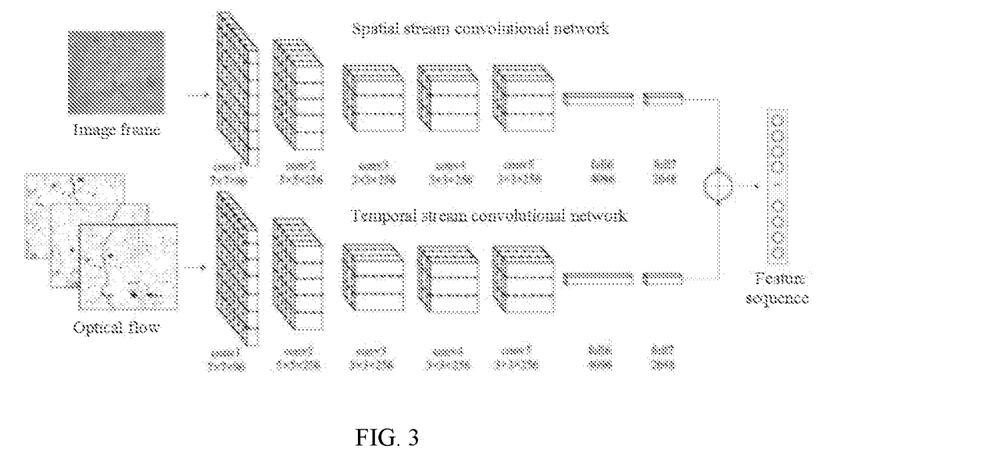
FIG. 3 is a block diagram of a two-stream network according to an example.

FIG. 2 provides an overall block diagram of a defect recognition method for a time sequence image of a dam defect. A main operation flow of the defect recognition method for a time sequence image of a dam defect is implemented as follows:
(1) Based on problems of a long time sequence of an image sequence for the dam defect and a large number of background frames independent of the defect, a defect location model is designed; a feature sequence of a time sequence image is extracted by using a two-stream network, and a time-dimensional self-attention mechanism is added to obtain a global feature relation so as to locate the defect, as shown in FIG. 3.
(1.1) An original time sequence image is input and denoted by $X=\{x_n\}_{n=1}^{l}$, where the sequence includes an image frame, and $x_n$ represents an $N_{th}$ frame of the sequence X;
(1.2) An original image sequence is converted into $S_n = (x_{t_n}, o_{t_n})$ as an input of the two-stream network, where $x_{t_n}$ represents a red green blue (RGB) image of the $t_n$ frame of the image sequence X; processing is performed through a spatial stream convolutional network, where $o_{t_n} = d_{t_n}(u, v)$ represents optical flows stacked by the $t_n$ frame and $t_n+1$ frame; and processing is performed through a temporal stream convolutional network, where $d_{t_n}^x(u, v)$ and $d_{t_n}^y(u, v)$ represent horizontal and vertical displacement vectors of the $t_n+1$ frame at a point (u, v), and may be regarded as two input channels of the convolutional neural network. In order to represent motion of a series of time sequence images, optical flows of L consecutive frames are superimposed to define 2L input channels, and an input of any frame τ is composed of the following formulas:

$$I_\tau(u,v,2k-1) = d_{\tau+k-1}^x(u,v),$$

$$I_\tau(u,v,2k) = d_{\tau+k-1}^x(u,v), u=[1;w], v=[1;h], k=[1;L],$$

where w and h in the formulas represent a width and a height of an input image, respectively;
(1.3) The feature sequence of the time sequence image extracted by the two-stream network is denoted by $$F = \{f_{t_n}\}_{n=1}^{l_s},$$

and a boundary assessment network is constituted by using three convolutional layers; and probabilities $$P_s = \{p_{t_n}^s\}_{n=1}^{l_s} \text{ and } P_E = \{p_{t_n}^e\}_{n=1}^{l_s}$$

of each frame as the start and end frames of the defect sequence are computed. The convolutional layer is denoted by Conv ($c_f$, $c_k$, f), where the parameters of $c_f$, $c_k$ and f are the number of convolution kernels, the number of channels, and an activation function, respectively, and a structure of the above boundary assessment network may be simply expressed as Conv (512, 3, Relu)→Conv (512, 3, Relu)→Conv (3, 1, sigmoid). The three convolutional layers has the same step length of 1. Finally an input feature of the time sequence image and the predicted probabilities of the start and end of the defect corresponding to each time sequence position are multiplied and combined, so as to obtain the feature sequence:

$$\hat{x}_{t_n} = x_{t_n} \times p_{t_n}^s \otimes x_{t_n} \times p_{t_n}^e.$$

(1.4) A position code is added to mark the time sequence position for each frame, and a global self-attention weight is computed for each frame by using a Transformer network:

$$\text{MultHeadAtten}(\hat{x}_{t_n}) = \Sigma_{m=1}^M W_m [\Sigma_{k \in \Omega_k} A_{mqk} \cdot W_m' \hat{x}_{t_n}],$$

where $W_m$ is an attention matrix with a learnable weight, and $A_{mqk}$ is a multi-head self-attention weight. The network includes 8 self-attention heads and a feedforward neural network with 2048 dimensions; a discard ratio is set as 0.1 and ReLU is used as the activation function; and a feature sequence of a defect image containing the attention weight is obtained.

(1.5) The feature sequence is regarded as an input of a multi-layer perceptron with three layers and 512 dimensions, and positions of the start and end frames are predicted and output.

(2) In a training process of the defect location model, to solve the problem that the model cannot pay attention to the position and integrity of the defect, a located defect is matched with a real defect by using an objective function based on a distance intersection-over-union; the time sequence position relation of the defect is computed to accelerate model convergence; and a loss term based on a tight sensing intersection-over-union is added to a loss function so as to improve accuracy of the model.

(2.1) In the training process of the model, the located defect $\hat{\varphi}_j$ is matched with the real defect $\varphi_j$ pairwise, and then an interval error is computed as a loss value so as to optimize the model. An optimal match is computed by maximizing the objective function, and the objective function is as follows:

$$\pi = \arg\max \Sigma_{n=1}^{N}(\text{DIoU}(\varphi_n, \hat{\varphi}_n) - l_1(\varphi_n, \hat{\varphi}_n)),$$

where $l_1$ is an L1 objective function having a strict matching boundary and DIoU is the distance intersection-over-union;

(2.2) In order to accelerate a training rate of the model and ensure that the model may converge when the located defect and real defect are not overlapped, the objective function based on the distance intersection-over-union is defined as:

$$DIoU = IoU - \frac{\rho^2(b, b^r)}{c^2},$$

where b and $b^r$ are central point coordinates of intervals of the located defect and the real defect, respectively; $\rho$ represents computing a distance between two points; and c is a length of a minimum time interval covering the two intervals simultaneously.

(2.3) Finally the loss function for the defect location task is defined as:

$$L_{box} = \frac{1}{N}\Sigma_{n=1}^{N}(L_{bou} + L_{pre}),$$

where $L_{bou}$ is a boundary loss configured to measure the deviance between the start and end frames of a defect interval and a real defect interval;

$$L_{bou} = (\hat{t}_s - t_s)^2 + (\hat{t}_e - t_e)^2,$$

where $t_s$ and $t_e$ are the positions of the start and end frames of an interval containing the defect, and $L_{pre}$ is an interval loss configured to measure accuracy and integrity of a defect interval predicted by the model using the tight sensing intersection-over-union:

$$L_{pre} = 1 - IoU \cdot \left(1 - \frac{\hat{\varphi} - \hat{\varphi} \cap \varphi}{\hat{\varphi}}\right).$$

Figure 4:
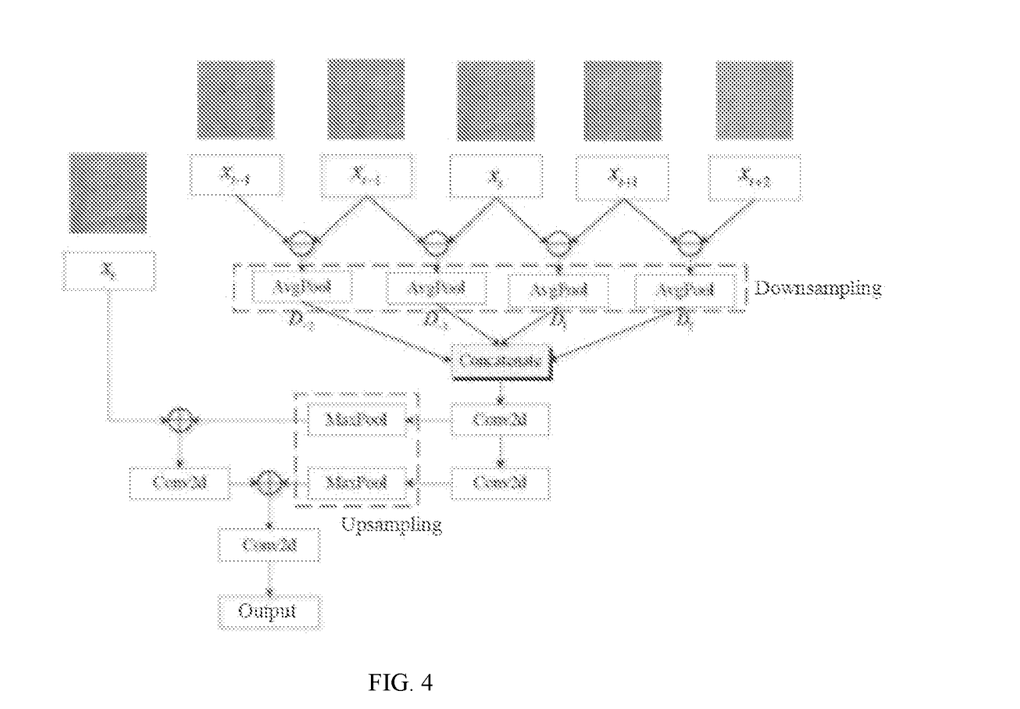
FIG. 4 is a block diagram of a convolutional network based on a two dimensional (2D) time sequence difference according to an example.

(3) After the defect sequence is located, frame sampling is performed by using a convolutional network based on a 2D time sequence difference, and visual and displacement information is extracted from a defect image frame so as to recognize a defect type, and the recognition accuracy is ensured while recognition of the model is accelerated, as shown in FIG. 4.

(3.1) The image sequence $\hat{x}_{t_n}$ containing the defect is divided into T non-overlapped fragments having an equal length, and a frame $x_t$ is randomly selected from each fragment, at a sampling frame rate of $\frac{1}{32}$, to form a set $X = [x'_1, x'_2, \ldots, x'_T]$ so as to increase variety of training, so that the convolutional network based on the 2D time sequence difference may learn changes of different instances of the same defect. The features are extracted, by the 2D convolutional neural network with Resnet 50 as a backbone network, from all sampling frames so as to obtain a feature set $F = [F_1, F_2, \ldots, F_T]$.

(3.2) Motion information is represented by the sampling frame of $\hat{F}_t = F_t + H(x_t)$; and in the feature $\hat{F}_t$, the sampling frame $F_t$ contributes visual image information and the feature stacking $H(x_t)$ contributes local motion information, and the motion information of n frames before and after the sampling frame is obtained by extracting and stacking the features of each frame before and after the sampling frame by an average pooling layer. The network structure is shown in FIG. 4.

(3.3) A sampled feature image sequence is decoded to obtain the defect type $\hat{F}_t$ by using the multi-layer perceptron with three layers and 512 dimensions and the softmax function.

Obviously, those skilled in the art should understand that the steps of the defect recognition method for a time sequence image of a dam defect described above can be implemented by a general-purpose computing apparatus. The steps can be concentrated on a single computing apparatus or distributed in a network composed of a plurality of computing apparatuses. Alternatively, the steps can be implemented by a procedure code executable by a computing apparatus, so that the steps can be stored in a storage apparatus and executed by the computing apparatus. In some cases, the steps can be implemented in the following ways: the steps shown or described can be performed in a different order from the order described herein, or can be separately made into individual integrated circuit modules, or a plurality of modules or steps therein can be made into a single integrated circuit. Therefore, the examples of the present disclosure are not limited to any particular combination of hardware and software.

What is claimed is:

1. An intelligent recognition method for a time sequence image of a concrete dam defect, comprising:
   (1) training a defect location model for a time sequence image characteristic containing a dam defect;
   (2) extracting, by the defect location model, a time sequence feature by using a two-stream network and a Transformer network, wherein the extracting further comprises:
     a. extracting the image feature by using the two-stream network;
     b. adding a time-dimensional self-attention mechanism to an image frame through the Transformer network; and
     c. obtaining a global feature relation, so as to identify a located defect;

(3) matching the located defect with a real defect using an objective function based on a distance intersection-over-union; wherein the matching further comprises:
  a. computing a defect position relation so as to accelerate a model convergence rate;
  b. adding a loss term based on a tight sensing intersection-over-union to a loss function; and
  c. paying attention, using the self-attention mechanism, to integrity of a defect sequence so as to improve accuracy of defect location;
(4) locating the defect sequence, wherein the locating further comprises:
  a. identifying a defect image frame from the defect sequence using a convolutional network based on a two dimensional (2D) time sequence difference; and
  b. recognizing a defect type by extracting visual and displacement information from the defect image frame.

2. The intelligent recognition method for a time sequence image of a concrete dam defect according to claim 1, wherein the extracting a time sequence feature by using a two-stream network and a Transformer network further comprises:
  (1.1) inputting an original time sequence image, denoted by $X=\{x_n\}_{n=1}^l$, wherein the sequence contains an image frame, and $x_n$ represents an $n_{th}$ frame of the sequence X;
  (1.2) converting the original time sequence image into $S_n=(x_{t_n}, o_{t_n})$ as an input of the two-stream network, wherein $x_{t_n}$ represents a red green blue (RGB) image of a $t_n$ frame of the original sequence image X; processing through a spatial stream convolutional network, wherein $o_{t_n}=d_{t_n}(u, v)$ represents an optical flow stacked by RGB images of the $t_n$ frame and a $t_n+1$ frame; and processing through a temporal stream convolutional network, wherein $d_{t_n}^x(u, v)$ and $d_{t_n}^y(u, v)$ represent horizontal and vertical displacement vectors of the $t_n+1$ frame at a point (u, v), respectively, and are regarded as two input channels of a convolutional neural network;
  (1.3) denoting a feature sequence of a time sequence image extracted by the two-stream network by $$F = \{f_{t_n}\}_{n=1}^{l_s},$$

and constituting a boundary assessment network by three convolutional layers; computing probabilities $$P_s = \{p_{t_n}^s\}_{n=1}^{l_s} \text{ and } P_E = \{p_{t_n}^e\}_{n=1}^{l_s}$$

of each frame as a start frame and an end frame of the defect sequence; and multiplying and combining an input feature of the time sequence image and the predicted probabilities, corresponding to each time sequence position, of start and end of the defect to obtain a feature sequence;
  (1.4) adding a position code so as to mark the time sequence position for each frame, and computing a global self-attention weight for each frame by using the Transformer network to obtain a feature sequence of a defect image containing the attention weight; and
  (1.5) predicting an image sequence of the feature sequence of the defect image containing the attention weight by using multi-layer perceptron, and outputting positions of the start frame and the end frame.

3. The intelligent recognition method for a time sequence image of a concrete dam defect according to claim 1, wherein the matching further comprises:
  (2.1) matching, in the training process of the model, the located defect $\hat{\varphi}_j$ with the real defect $\varphi_j$ pairwise, and then computing an interval error as a loss value so as to optimize the model; and computing, in a matching process, an optimal match by maximizing the objective function, wherein the objective function is as follows:

$$\pi = \arg\max \sum_{n=1}^{N}(DIoU(\varphi_n, \hat{\varphi}_n) - l_1(\varphi_n, \hat{\varphi}_n))$$

wherein $l_1$ is an L1 objective function having a strict matching boundary and DIoU is the distance intersection-over-union;
  (2.2) defining the objective function based on the distance intersection-over-union as:

$$DIoU = IoU - \frac{\rho^2(b, b^t)}{c^2}$$

wherein IoU is an intersection-over-union of two defects; b and $b^t$ are center point coordinates of intervals of the located defect and the real defect, respectively; $\rho$ represents computing a distance between two points; and c is a length of a minimum time interval covering the intervals of the located defect and the real defect simultaneously; and
  (2.3) finally defining a loss function of a defect location task as:

$$L_{box} = \frac{1}{N}\sum_{n=1}^{N}(L_{bou} + L_{pre})$$

wherein $L_{bou}$ is a boundary loss configured to measure a difference between the start and end frames of a defect interval and a real defect interval; and $L_{pre}$ is an interval loss configured to measure accuracy and integrity of a defect interval predicted by the model.

4. The intelligent recognition method for a time sequence image of a concrete dam defect according to claim 1, wherein the locating further comprises:
  (3.1) dividing an extracted defect sequence into several non-overlapped fragments having an equal length, and randomly selecting a frame from each fragment so as to form a sampling frame set;
  (3.2) taking each sampling frame as a center, selecting several frames before and after the center so as to perform stacking, and fusing a current frame through residual connection; and capturing a short-term displacement feature, so that a single sampling frame can sense a local change; and
  (3.3) decoding a sampled feature image sequence by using a multi-layer perceptron and a softmax function so as to recognize the defect type.

5. The intelligent recognition method for a time sequence image of a concrete dam defect according to claim 4, wherein features are extracted from all sampling frames through the 2D convolutional neural network, so as to obtain a feature set $F=[F_1, F_2, \ldots, F_T]$; motion information represented by the sampling frame is $\hat{F}_t=F_t+H(x_t)$; and in the feature $\hat{F}_t$, the sampling frame Ft contributes visual image information and feature stacking $H(x_t)$ contributes local motion information.

6. The intelligent recognition method for a time sequence image of a concrete dam defect according to claim 2, wherein in order to represent motion of a series of time sequence images, optical flows of L consecutive frames are superimposed to define 2L input channels using the horizontal and vertical displacement vectors of the L consecutive frames, and an input of any frame τ is composed of the following formulas:

$$I_\tau(u,v,2k-1)=d_{\tau+k-1}^x(u,v),$$

$$I_\tau(u,v,2k)=d_{\tau+k-1}^x(u,v), u=[1;w], v=[1;h], k=[1;L],$$

wherein w and h in the formulas represent a width and a height of an input image, respectively.

7. A computer device, comprising a memory, a processor and a computer program stored in the memory and tunnable on the processor, wherein when the processor executes the computer program, the intelligent recognition method for a time sequence image of a concrete dam defect according to claim 1 is implemented.

8. A computer device, comprising a memory, a processor and a computer program stored in the memory and tunnable on the processor, wherein when the processor executes the computer program, the intelligent recognition method for a time sequence image of a concrete dam defect according to claim 2 is implemented.

9. A computer device, comprising a memory, a processor and a computer program stored in the memory and tunnable on the processor, wherein when the processor executes the computer program, the intelligent recognition method for a time sequence image of a concrete dam defect according to claim 3 is implemented.

10. A computer device, comprising a memory, a processor and a computer program stored in the memory and tunnable on the processor, wherein when the processor executes the computer program, the intelligent recognition method for a time sequence image of a concrete dam defect according to claim 4 is implemented.

11. A computer device, comprising a memory, a processor and a computer program stored in the memory and tunnable on the processor, wherein when the processor executes the computer program, the intelligent recognition method for a time sequence image of a concrete dam defect according to claim 5 is implemented.

12. A computer device, comprising a memory, a processor and a computer program stored in the memory and tunnable on the processor, wherein when the processor executes the computer program, the intelligent recognition method for a time sequence image of a concrete dam defect according to claim 6 is implemented.

13. A non-transitory computer-readable storage medium, storing a computer program configured to execute the intelligent recognition method for a time sequence image of a concrete dam defect according to claim 1 is implemented.

14. A non-transitory computer-readable storage medium, storing a computer program configured to execute the intelligent recognition method for a time sequence image of a concrete dam defect according to claim 2 is implemented.

15. A non-transitory computer-readable storage medium, storing a computer program configured to execute the intelligent recognition method for a time sequence image of a concrete dam defect according to claim 3 is implemented.

16. A non-transitory computer-readable storage medium, storing a computer program configured to execute the intelligent recognition method for a time sequence image of a concrete dam defect according to claim 4 is implemented.

17. A non-transitory computer-readable storage medium, storing a computer program configured to execute the intelligent recognition method for a time sequence image of a concrete dam defect according to claim 5 is implemented.

18. A non-transitory computer-readable storage medium, storing a computer program configured to execute the intelligent recognition method for a time sequence image of a concrete dam defect according to claim 6 is implemented.

\* \* \* \* \*